United States Patent
Menon et al.

(10) Patent No.: US 12,209,043 B1
(45) Date of Patent: Jan. 28, 2025

(54) SYSTEM AND METHOD FOR REMOVAL OF PERFLUOROALKYL AND POLYFLUOROALKYL SUBSTANCES (PFAS) AND MICRO-CONSTITUENTS FROM LEACHATE TREATMENT RESIDUAL WASTE STREAMS

(71) Applicant: WM INTELLECTUAL PROPERTY HOLDINGS, L.L.C., Houston, TX (US)

(72) Inventors: Rohan Menon, Chester, PA (US); Ty Corneau, Brookfield, NH (US); Robert Magnusson, Brentwood, NH (US); Brian Brazil, Damascus, MD (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 18/132,044

(22) Filed: Apr. 7, 2023

Related U.S. Application Data

(63) Continuation of application No. 16/945,197, filed on Jul. 31, 2020, now Pat. No. 11,623,884.

(60) Provisional application No. 62/882,342, filed on Aug. 2, 2019.

(51) Int. Cl.
| | |
|---|---|
| *C02F 9/00* | (2023.01) |
| *C02F 1/28* | (2023.01) |
| *C02F 1/42* | (2023.01) |
| *C02F 1/44* | (2023.01) |
| *C02F 1/467* | (2023.01) |

(Continued)

(52) U.S. Cl.
CPC ............. *C02F 9/00* (2013.01); *C02F 1/283* (2013.01); *C02F 1/42* (2013.01); *C02F 1/441* (2013.01); *C02F 1/4672* (2013.01); *C02F 2101/36* (2013.01); *C02F 2103/06* (2013.01)

(58) Field of Classification Search
None
See application file for complete search history.

(56) References Cited

U.S. PATENT DOCUMENTS

| | | | | |
|---|---|---|---|---|
| 5,182,023 | A | * | 1/1993 | O'Connor ............... C02F 1/444 |
| | | | | 210/651 |
| 6,814,840 | B2 | | 11/2004 | Henuset et al. |
| 9,221,695 | B2 | | 12/2015 | Fath |

(Continued)

FOREIGN PATENT DOCUMENTS

| | | |
|---|---|---|
| CN | 102107977 | 5/2013 |
| CN | 105692798 | 6/2016 |
| WO | 2014/027175 | 2/2014 |

OTHER PUBLICATIONS

Shaheen et al., Reverse osmosis pretreatment technologies and future trends: A comprehensive review, Desalination, vol. 452, 2019, p. 159-195 (available on line Nov. 22, 2018) (Year: 2019).*

(Continued)

*Primary Examiner* — Chester T Barry
(74) *Attorney, Agent, or Firm* — Greenberg Traurig LLP

(57) ABSTRACT

A system and method for removing and destroying PFAS from residual waste streams generated during the processing of landfill liquids prior to disposal are provided. The presently disclosed system and method can concentrate PFAS from landfill liquids into a residual waste stream so that the target compounds can be selectively removed for subsequent destruction.

2 Claims, 1 Drawing Sheet

(51) Int. Cl.
*C02F 101/36* (2006.01)
*C02F 103/06* (2006.01)

(56) References Cited

U.S. PATENT DOCUMENTS

| | | | |
|---|---|---|---|
| 9,440,866 | B2 | 9/2016 | Legzdins |
| 9,731,989 | B2 | 8/2017 | Polizzotti et al. |
| 9,957,172 | B2 | 5/2018 | Niu et al. |
| 10,287,185 | B2 | 5/2019 | Nickelsen et al. |
| 11,623,884 | B1 * | 4/2023 | Menon .................. C02F 1/42 210/638 |
| 2010/0084343 | A1 | 4/2010 | Mader et al. |
| 2011/0186495 | A1 * | 8/2011 | Robinson ............. B01F 25/433 210/198.1 |
| 2013/0316898 | A1 * | 11/2013 | De Leij ................ B01J 20/041 210/660 |
| 2016/0207796 | A1 | 7/2016 | Li et al. |
| 2018/0187253 | A1 * | 7/2018 | Yamamoto ............. C12Q 1/68 |
| 2019/0185352 | A1 | 6/2019 | Chiang |
| 2019/0263696 | A1 | 8/2019 | Bott et al. |
| 2019/0283001 | A1 | 9/2019 | Ortiz et al. |
| 2020/0222953 | A1 | 7/2020 | Morrell |
| 2020/0239336 | A1 * | 7/2020 | Lutterbach ............ C08F 212/08 |
| 2020/0399147 | A1 * | 12/2020 | Yost ..................... C02F 1/4672 |
| 2020/0407248 | A1 * | 12/2020 | Yang .................... C02F 1/4672 |
| 2021/0009449 | A1 * | 1/2021 | Borowski .............. B09B 1/004 |
| 2021/0032136 | A1 * | 2/2021 | Cates ................... B01J 27/186 |
| 2021/0101804 | A1 * | 4/2021 | Garber .................. C02F 1/24 |
| 2021/0206667 | A1 * | 7/2021 | Locke ................... C02F 1/4672 |
| 2022/0009809 | A1 | 1/2022 | Xiao |
| 2022/0054981 | A1 | 2/2022 | Benton et al. |

OTHER PUBLICATIONS

INDEECO Case Study: Reverse Osmosis: Water Preheat, INDEECO Inc., St Louis, MO (USA) (undated) (downloaded 14—Dec. 2, 2023) (Year: 2023).* https://aquaticlife.com/blogs/news/how-temperature-affects-ro-water-production, Jan. 1, 2019 (downloaded Dec. 14, 2023) (Year: 2019).*

Merino, Nancy et al.; Degradation and Removal Methods for Perfluoroalkyl and Polyfluoroalkyl Substances in Water; Environmentla Enginnering Science; vol. 33, No. 9; Mary Ann Liebert, Inc.; Aug. 22, 2016; 35 pages.

Niu, Junfeng et al.; Electrochemical Oxidation of Perfluorinated Compunds in Water, Chemosphere; Dec. 30, 2015; 13 pages.

Du, Ziwen et al.; Removal of Perfluorinated Carboxylates from Washing Wastewater of Perfluorooctanesulfonyl Flouride Using Activated Carbons and Resins; Journal of Hazardous Meterials; Dec. 24, 2014; 8 pages.

Zaggia, Alessandro et al.; Use of Strong Anion Exchange Resins for the Removal of Perfluoroalkylated Substances from Contaminated Drinking Water in Batch and Continuous Pilot Plants; Water Research Zaggia 2016; Dec. 30, 2015; 10 pages.

* cited by examiner

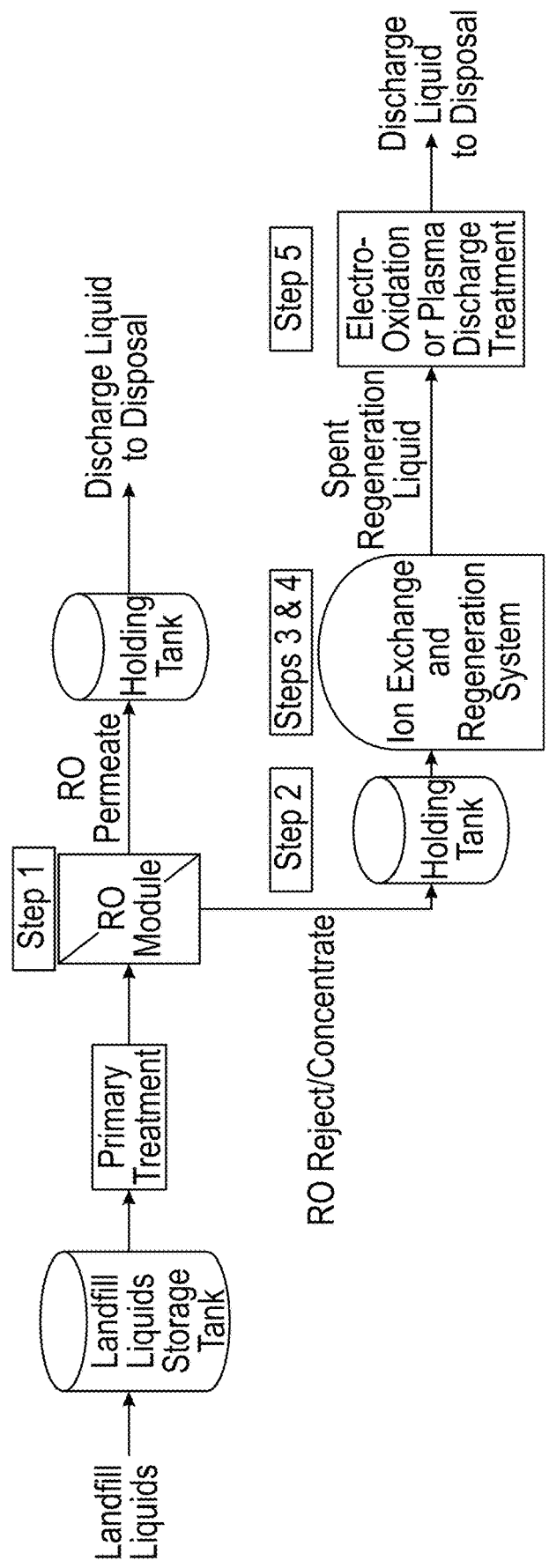

SYSTEM AND METHOD FOR REMOVAL OF PERFLUOROALKYL AND POLYFLUOROALKYL SUBSTANCES (PFAS) AND MICRO-CONSTITUENTS FROM LEACHATE TREATMENT RESIDUAL WASTE STREAMS

CROSS REFERENCE TO RELATED APPLICATIONS

This application is a continuation application of, and claims the benefit of, U.S. application Ser. No. 16/945,197 filed Jul. 31, 2020, which claims the benefit, and priority benefit, of U.S. Provisional Application 62/882,342 filed Aug. 2, 2019, the contents and disclosure of which are incorporated by reference herein in their entirety.

BACKGROUND

Field of the Invention

The presently disclosed subject matter relates generally to removal of undesired chemicals from industrial waste streams, and more specifically, to removal of perfluoroalkyl and polyfluoroalkyl substances and other micro-constituents from leachate treatment waste streams.

Description of the Related Art

In recent years, there has been an increased interest in studying the effects of perfluoroalkyl and polyfluoroalkyl substances on humans. These substances (often referred to as "PFAS") are manufactured chemicals that can be found in various consumer and industrial products.

PFAS are sometimes referred to as "forever chemicals" because the molecules are characterized by a chain of strong fluorine-carbon bonds which result in a highly stable and long persisting chemical. It is believed that long term human exposure to PFAS can increase the risk of cancer, increase cholesterol levels, affect the immune system, and interfere with hormone levels.

It is known in the art to use various treatment efforts to remove these perfluoroalkyl and polyfluoroalkyl substances from industrial waste streams. However, these previous treatment efforts have proven to be cost prohibitive and inefficient, and do not provide satisfactory results.

Improvements in this field are therefore desired.

SUMMARY

Various illustrative embodiments of an improved system and method for removing and destroying PFAS from residual waste streams generated during the processing of landfill liquids prior to disposal are described herein, In certain illustrative embodiments, a system for removing perfluoroalkyl and polyfluoroalkyl substances (PFAS) from a waste stream is provided. The system can include a first treatment module comprising a reverse osmosis system, wherein the reverse osmosis system is configured to produce a permeate stream comprising treating water and a reject/concentrate stream, and wherein the reject/concentrate stream has a substantially higher concentration of PFAS than the permeate stream, a second treatment module comprising one or more ion exchange vessels and/or one or more activated carbon vessels, wherein the second treatment module is configured to receive the reject/concentrate stream from the first treatment module, and wherein a product of the second treatment module is a spent regeneration stream that is concentrated with PFAS, and a third treatment module comprising one or more of an electro-oxidation vessel and a low temperature vapor phase plasma discharge vessel, wherein the third treatment module is configured to receive the spent regeneration stream from the first treatment module, and wherein a product of the third treatment module is a treated water stream that is substantially devoid of PFAS. The waste stream can be a leachate treatment stream.

In certain illustrative embodiments, a method of removing perfluoroalkyl and polyfluoroalkyl substances (PFAS) from a waste stream is also provided. The waste stream can be introduced into a first treatment module, the first treatment module comprising a reverse osmosis vessel, wherein the reverse osmosis module is configured to produce a permeate stream comprising treating water and a reject/concentrate stream, and wherein the reject/concentrate stream has a substantially higher concentration of PFAS than the permeate stream. The reject/concentrate stream can be introduced from the first treatment module into a second treatment module comprising one or more of an ion exchange vessel and an activated carbon vessel, wherein the second treatment module is configured to produce a spent regeneration stream that is concentrated with PFAS. The spent regeneration stream can be introduced from the second treatment module into a third treatment module comprising one or more of an electro-oxidation vessel and a low temperature vapor phase plasma discharge vessel, wherein the third treatment module is configured to produce a treated water stream that is substantially devoid of PFAS. The waste stream can be a leachate treatment stream.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

BRIEF DESCRIPTION OF THE DRAWINGS

FIG. 1 is a flow diagram of an illustrative system and method according to embodiments of the present disclosure.

DETAILED DESCRIPTION

Various illustrative embodiments of an improved system and method for removing and destroying PFAS from residual waste streams generated during the processing of landfill liquids prior to disposal are described herein.

An example of a landfill liquid is leachate. Landfill leachate can contain dissolved or entrained environmentally harmful substances such as PFAS that may enter the environment if not properly treated.

In certain illustrative embodiments, the presently disclosed system and method can concentrate PFAS from landfill liquids into a residual waste stream so that the target compounds can be selectively removed for subsequent destruction.

Referring now to FIG. 1, an illustrative system and method are shown. In Step 1, after an initial steam pretreatment, landfill liquids can be initially processed through a reverse osmosis (RO) module, such as commercially available from Dynatec Systems, Inc. or Rochem Americas. The permeate stream from the RO module can be delivered to a holding tank for some alternative reuse and/or discharged for disposal. In Step 2, the reject/concentrate stream from the RO module can be collected in a holding tank for storage and further processing. In Step 3, the reject/concentrate stream can be discharged from the holding tank and processed via a selective ion exchange (IX) regenerable media system, such as commercially available from Emerging Compounds Treatment Technologies, Inc (ECT2). In Step 4, once the IX media has reached its removal capacity, the media can be regenerated thereby producing a spent liquid regeneration stream that is concentrated with PFAS. The regenerated IX media can then be returned to service. In Step 5, the spent liquid regeneration stream can be further processed using an electro-oxidation and/or low temperature/vapor phase plasma discharge technology, such as commercially available from AECOM under the brand DE-FLUORO™, to produce treated water which can then be discharged for disposal with other landfill liquids.

In certain illustrative embodiments, PFAS compounds can be pre-concentrated/removed from the wastewater stream using reverse osmosis (RO) technology. The RO concentrate containing the higher concentration PFAS can then be passed through regenerable ion exchange media that removes PFAS. Once the media is regenerated, the PFAS can be further concentrated prior to processing by a technology that will achieve PFAS destruction. The presently disclosed treatment approach does not rely on only one specific technology for PFAS destruction. Instead, various destructive approaches such as electro-chemical oxidation (such as DE-FLUORO™ or others) and plasma can be employed together in the process.

In accordance with FIG. 1, a system for removing perfluoroalkyl and polyfluoroalkyl substances (PFAS) from a waste stream is provided. In certain illustrative embodiments, the system can include a first treatment module comprising a reverse osmosis system, wherein the first treatment module is configured to produce a permeate stream comprising treated water and a reject/concentrate stream comprising PFAS. The reverse osmosis system is typically non-selective and removes all compounds that have molecule sizes larger than the pore size of the member, so the RO concentrate will comprise various other compounds in addition to PFAS. The reject/concentrate stream will have a substantially higher concentration of PFAS than the permeate stream. The system can also include a second treatment module comprising one or more ion exchange vessels and/or activated carbon vessels, wherein the second treatment module is configured to receive the reject/concentrate stream from the first treatment module, and wherein a product of the second treatment module is a spent regeneration stream that is concentrated with PFAS. In certain illustrative embodiments, the spent regeneration stream can contain greater than 500 mg/L of PFAS as compared to 1-20 mg/L typically observed in leachate. The system can also include a third treatment module comprising one or more of an electro-oxidation vessel and a low temperature vapor phase plasma discharge vessel, wherein the third treatment module is configured to receive the spent regeneration stream from the first treatment module, and wherein a product of the third treatment module is a treated water stream that is substantially devoid of PFAS. In certain illustrative embodiments, the treated concentrations would expect to be less than 10 ng/L. The waste stream can be, for example, a leachate treatment stream.

In accordance with FIG. 1, a method for removing perfluoroalkyl and polyfluoroalkyl substances (PFAS) from a waste stream is also provided. In certain illustrative embodiments, the waste stream can be introduced into a first treatment module, the first treatment module comprising a reverse osmosis system, wherein the first treatment module is configured to produce a permeate stream comprising, for example, treated water, and a reject/concentrate stream substantially comprising PFAS. The reject/concentrate stream will have a substantially higher concentration of PFAS than the permeate stream. The reject/concentrate stream from the first treatment module can be introduced into a second treatment module comprising one or more of an ion exchange vessel and an activated carbon vessel, wherein the second treatment module is configured to produce a spent regeneration stream that is concentrated with PFAS. The spent regeneration stream from the second treatment module can be introduced into a third treatment module comprising one or more of an electro-oxidation vessel and a low temperature vapor phase plasma discharge vessel, wherein the third treatment module is configured to produce a treated water stream that is substantially devoid of PFAS. The waste stream can be, for example, a leachate treatment stream.

In certain illustrative embodiments, the presently disclosed system and method is also effective for removing and destroying microconstituents such as 1-4 dioxane and NDMA (N-Nitrosodimethylanime) may be potentially concentrated in residual waste streams generated during the processing of the landfill liquids. In other words, the microconstituents can be removed and destroyed in addition to any PFAS that are removed and destroyed using the presently described technology.

FIG. 1 herein illustrates an exemplary system and method with a plurality of sequential, non-sequential, or sequence independent "steps" using the equipment shown or described herein. It should be noted that the system and method of FIG. 1 is exemplary and may be performed in different orders and/or sequences as dictated or permitted by the equipment described herein, and any alternative embodiments thereof. Numerous arrangements of the various "steps" and equipment can be utilized. In addition, not all "steps" or equipment described herein need be utilized in all embodiments. However, it should be noted that certain particular arrangements of equipment and/or "steps" for the system and method described herein are materially distinguishable from and provide distinct advantages over previously known technologies.

The presently disclosed system and method have a number of advantages over prior art technologies. For example, in certain illustrative embodiments, the system and method provide a strategy of complete destruction of the PFAS compounds rather than concentrating and containing them within the landfill. An additional advantage is that by destroying the compounds, the potential for future contamination is eliminated.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A method of removing perfluoroalkyl and polyfluoroalkyl substances (PFAS) from a waste stream, the method comprising:

steam pre-treating the waste stream;

introducing the steam pre-treated waste stream into a first treatment module, the first treatment module comprising a reverse osmosis vessel, wherein the reverse osmosis module is configured to produce a reverse osmosis permeate stream and a reject/concentrate stream, and wherein the reject/concentrate stream has a substantially higher concentration of PFAS than the permeate stream;

introducing the reject/concentrate stream from the first treatment module into a second treatment module comprising one or more of an ion exchange vessel and an activated carbon vessel, wherein the second treatment module is configured to produce a spent regeneration stream that is concentrated with PFAS, and wherein there is no additional treatment of the reject/concentrate stream between the first treatment module and the second treatment module; and introducing the spent regeneration stream from the second treatment module into a third treatment module comprising one or more of an electro-oxidation vessel and a low temperature vapor phase plasma discharge vessel, wherein the third treatment module is configured to produce a treated water stream that is substantially devoid of PFAS, and wherein there is no additional treatment of the spent regeneration stream between the second treatment module and the third treatment module.

2. The method of claim 1, wherein the product of the third treatment module is a treated water stream that is substantially devoid of PFAS, 1,4-dioxane and NDMA (N-nitrosodimethylanime).

* * * * *